No. 685,660. Patented Oct. 29, 1901.
G. L. WOODWORTH.
LAVATORY OR BATH.
(Application filed Oct. 30, 1900.)
(No Model.)
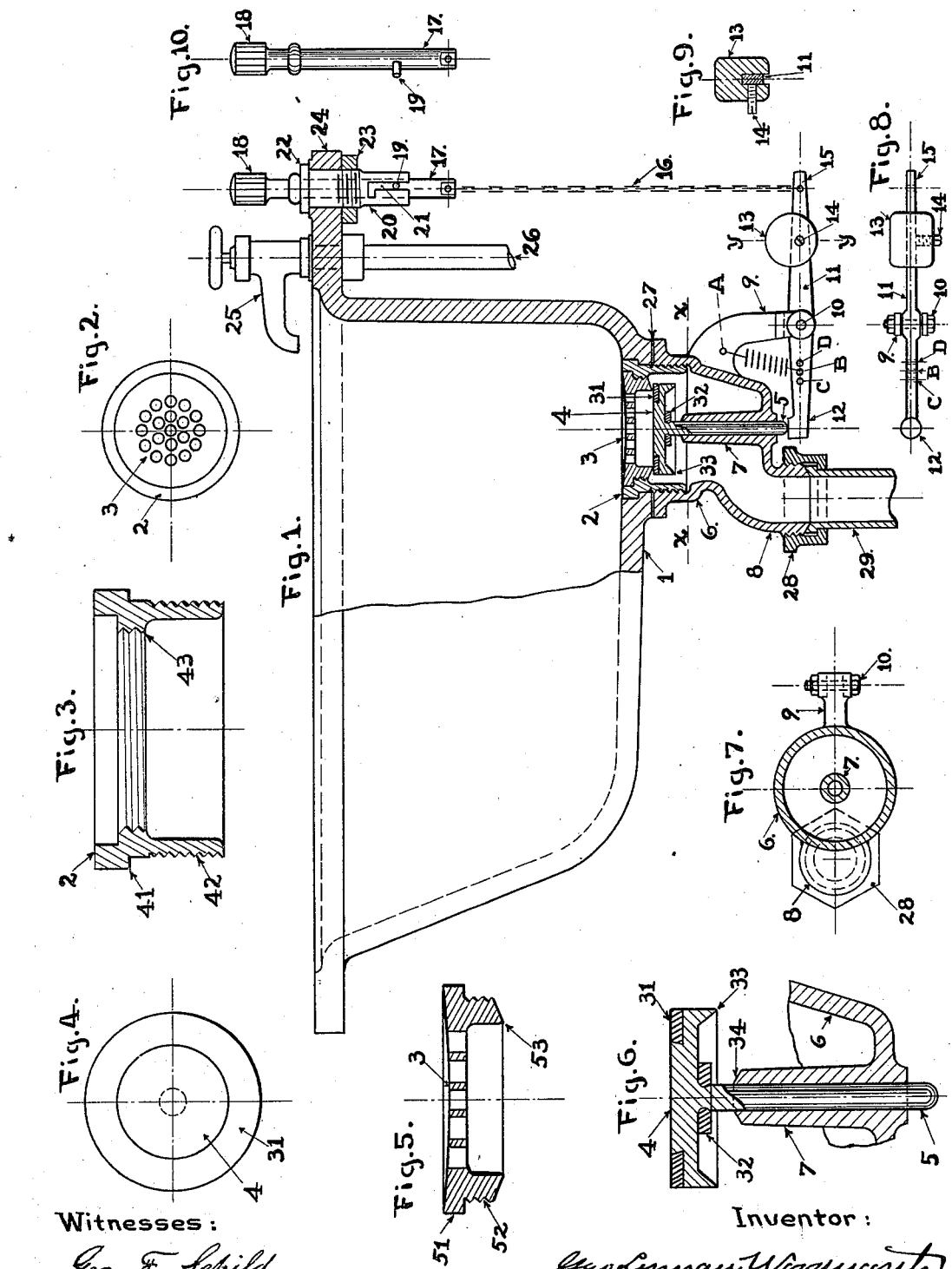
Witnesses:
Geo. F. Schild.
Jas. W. McMillan
Inventor:
Geo. Lyman Woodworth

UNITED STATES PATENT OFFICE.

GEORGE LYMAN WOODWORTH, OF STANFORD UNIVERSITY, CALIFORNIA.

LAVATORY OR BATH.

SPECIFICATION forming part of Letters Patent No. 685,660, dated October 29, 1901.

Application filed October 30, 1900. Serial No. 34,957. (No model.)

*To all whom it may concern:*

Be it known that I, GEORGE LYMAN WOODWORTH, a citizen of the United States, residing at Stanford University, in the county of Santa Clara and State of California, have invented certain new and useful Improvements in Lavatories or Baths, of which the following is a specification.

My invention relates to sanitary-plumbing apparatus.

My invention consists in a lavatory or bath vessel with a downward-opening valve in the drain or outlet passage thereof and in suitable means for controlling and operating the same, whereby certain automatic features are attained, together with certain constructive details relative thereto, more fully hereinafter described in connection with the accompanying drawings, forming a part of this specification.

Figure 1 shows a side elevation, partly in section, of my invention, a portion of the vessel being broken away to better show the construction. Fig. 2 shows a plan view of the strainer or perforated cover, together with the outlet-bushing, disconnected from other parts. Fig. 3 shows a vertical central section of the outlet-bushing of Fig. 2 separate and on a larger scale. Fig. 4 shows a plan of the valve separate and on a larger scale. Fig. 5 shows a vertical central section of the strainer or perforated cover separate and on a larger scale. Fig. 6 shows a side elevation, partly in section, of the valve, together with a portion of the casing in which it operates. Fig. 7 shows a cross-section $x$ $x$ of Fig. 1. Fig. 8 shows a plan of the controlling-lever. Fig. 9 shows a cross-section $y$ $y$ of Fig. 1. Fig. 10 shows a side elevation of the operating-handle disconnected from other members.

In the several views of the drawings similar characters refer to similar parts.

Referring to Fig. 1, the lavatory or bath vessel 1 is formed with an opening in the bottom or lower side thereof adapted to receive a suitable tube or bushing. This outlet tube or bushing 2, (see Figs. 1 and 3,) with its flange 41 resting in a corresponding recess in the said vessel and its lower screw-threaded portion 42 engaging with a corresponding screw-thread in the pipe or casing 6, is preferably provided with internal screw-threads 43, adapted to engage with corresponding threads 52 in the strainer or perforated cover 3. This strainer or perforated cover 3 (see also Fig. 5) I prefer to make with a flange 51 and with finished surfaces 53 in the form of an annular edge or lip serving as a valve-seat, as will be more fully hereinafter described.

The pipe or casing 6 (see Figs. 1 and 7) is formed or fitted with a suitable outlet portion 8, an inward-projecting tube or bushing 7, adapted as a valve-stem guide, and an arm or lug 9, adapted as a support for the controlling-lever 11. The said outlet portion 8 is preferably screw-threaded and fitted with a union joint or coupling 28, so connection may readily be made or broken with the waste-pipe 29. A washer or gasket 27, of rubber or other suitable material, is best placed between the casing 6 and vessel 1, as shown in Fig. 1.

Referring to Figs. 1 and 6, it will be seen that the valve-stem 5, preferably rounded, which reaches through the casing 6, is protected from water by means of the upward-projecting valve-stem bushing 7, as well as by the drip edge 33 upon the valve 4. I deem it best to make the valve 4 with rubber surfaces 31 where engagement occurs with the valve-seat 53, thereby forming a water-tight joint with light pressure between the said parts. The neck of the valve-stem is preferably fitted with the rubber ring 32, which ring when the valve 4 is in its lower position bears against the upper extremity 34 of the guide-bushing 7.

The lever 11, fulcrumed upon the pin 10 in the lug 9, (see Fig. 1,) engages at one end 12 with the valve-stem 5 and at its other end 15 with a suitable connection 16 to the operating-handle 18, as will be more fully described. I deem it best to furnish the said lever 11 with an adjustable weight or mass 13, as shown in Figs. 1, 8, and 9, though I do not limit myself to this construction.

In some forms of my invention a spring or springs may be used in place of the weight 13 to produce the same results—namely, to urge the valve 4 against the valve-seat 53 and close the drain-passage of the vessel. Such an arrangement (see Fig. 1) is indicated by the broken lines representing a spring connected between the holes A and B in the parts 9 and 11, respectively, the constraining effect thereof being increased or decreased by shifting from opening B to C or D, respectively; nor do I limit myself to this indicated disposition, it being perfectly obvious that the said spring or springs may be otherwise made and placed to produce substantially the same effects.

Referring now to Figs. 1 and 10, the rod or bar 17, mounted in the bushing 20, is provided with a suitable handle 18 for operating, a suitable connection, preferably the chain 16, to the controlling-lever 11, and with a suitable pin or peg 19, described further herein. The bushing 20, (see Fig. 1,) made fast, preferably by means of the flange 22 and nut 23, to any suitable support, such as the upper rim 24 of the vessel 1 or to a lug (not shown) upon the water-supply pipe 26, contains a suitable groove or slot 21, formed with a bend or notch adapted to engage the said pin or peg 19, as will be described herein under the mode of operation. The operating-handle 18 (see Fig. 1) is stationed where conveniently accessible, preferably side by side with the hydrant 25 or hydrants (one being shown) of the vessel 1.

The mode of operation is as follows: The handle 18 is raised up and slightly rotated, causing the pin 19 to engage with the notch or bend in the slot 21, thus holding or hooking up the rod 17, oscillating the lever 11, opening or releasing the valve 4, and discharging the contents of the vessel 1 through the waste-pipe 29. The drain-valve 4, it will be seen, has a downwardly-directed motion in opening. I prefer to make the apparatus so that the drain-valve 4 opens at a predetermined head and discharges automatically all excess of water from the vessel, which is effected by a certain correspondence between the controlling means and other parts of the apparatus, as will be pointed out, the pressure upon the valve varying directly as the area of the valve-port at the valve and as the head of water thereon is known for any certain desired conditions, remembering that a head of about twenty-eight inches gives a pressure of one pound per square inch. For example, should the valve-port be two inches in diameter a head of water of seven inches would give a pressure of almost precisely three-quarters of a pound avoirdupois upon the valve. Then the weight 13 would be made to equal about three-quarters of a pound, and its leverage adjusted as requires no further explanation, reference being had to the drawings.

Referring to Fig. 1, it will be seen that the strainer or perforated cover 3 may readily be unscrewed and lifted upward from the bushing 2 without breaking any pipe connections or disturbing other parts of the apparatus, the valve 4 withdrawn, and the inside of the casing 6 exposed for inspection or cleaning.

In regard to the piping for the vessel, the least cross-area of the drain-passage at or before the valve 4 would preferably not exceed the least cross-area of the drain pipes or passages behind the valve 4. The waste-pipe 29 is preferably connected with a trap (not shown) in the usual and well-known manner.

The supports for the vessel 1 are omitted from the drawings for the sake of simplicity. The vessel is held or supported in any suitable manner—as, for instance, by legs or feet from underneath or by means of brackets or side fastenings.

I make the vessel 1 of any suitable material—such as iron, stone, or earthenware, preferably enameled—and the working parts thereof preferably of bronze. In my invention the form and size of the vessel 1 make no difference.

My improvements apply to washbasins or lavatories as well as to bath-tubs.

I claim and desire to secure by Letters Patent—

1. The combination with a lavatory or bath vessel containing a recessed opening in its lower side fitted with an outlet-bushing coupled to the discharge pipe or casing below; of an upwardly-removable perforated cover interlocking with said bushing and formed on its under side as a valve-seat; a downward-opening under-operated valve mounted upon a reciprocated stem, and adapted to close against the said valve-seat; suitable means for urging the said valve against the said valve-seat; and suitable means for operating the said valve, substantially as shown and described.

2. The combination with a lavatory or bath vessel containing a recessed opening in its lower side; of an outlet-bushing supported in said opening and coupled to the discharge pipe or casing below; an upwardly-removable perforated cover interlocking with said bushing and formed on its under side with an annular edge or lip adapted as a valve-seat; a downward-opening under-operated valve with cushioned surfaces mounted upon a reciprocating stem and adapted to close against the said valve-seat; adjustable means for urging the said valve against the said valve-seat; and suitable means for operating the said valve, substantially as shown and described.

3. The combination with a lavatory or bath vessel containing a recessed opening in its lower side; of an outlet-bushing supported in said opening and coupled to the discharge pipe or casing below; an upwardly-removable perforated cover interlocking with said bushing and formed on its under side with an annular edge or lip adapted as a valve-seat; a suitable casing beforesaid, coupled to said bushing, and containing a guide-sleeve; a downward-opening under-operated valve mounted upon a reciprocating stem running in said sleeve, and containing cushioned surfaces adapted to be raised and lowered to close against the valve-seat and guide-sleeve respectively; adjustable means for urging the said valve against the said valve-seat; and suitable means for operating the said valve, substantially as shown and described.

4. The combination with a lavatory or bath vessel containing a recessed opening in its lower side; of an outlet-bushing supported in said opening and coupled to the discharge pipe or casing below; an upwardly-removable perforated cover interlocking with said bushing and formed on its under side with an annular edge or lip adapted as a valve-seat; a suitable casing beforesaid, coupled to said bushing, and containing a guide-sleeve; a downward-opening under-operated valve mounted upon a reciprocating stem running in said sleeve, and containing cushioned surfaces adapted to be raised and lowered to close against the valve-seat and guide-sleeve respectively; a lever suitably fulcrumed, engaging at one end with the said valve-stem, and at its other end fitted with an adjustable weight; and a connection to an operating device whereby the said lever may be oscillated, substantially as shown and described.

5. The combination with a lavatory or bath vessel containing a suitable opening in its lower side; of a suitable outlet-bushing in said opening; a suitable perforated cover engaging with said bushing and containing an annular edge or lip adapted as a valve-seat; a suitable pipe or casing engaging with said outlet-bushing and containing an inward-projecting valve-stem bushing; a downward-opening valve with rubber surfaces, adapted to engage with said valve-seat, and mounted upon a stem operating in said valve-stem bushing; suitable means for urging the said valve against the said valve-seat; and suitable means for operating the said valve; substantially as shown and described.

6. The combination with a lavatory or bath vessel containing a suitable opening in its lower side; of a suitable outlet-bushing in said opening; a suitable perforated cover engaging with said outlet-bushing and containing an annular edge or lip adapted as a valve-seat; a suitable pipe or casing engaging with said outlet-bushing and containing an inward-projecting valve-stem bushing; a downward-opening valve with rubber surfaces adapted to engage with said valve-seat and mounted upon a stem operating in said valve-stem bushing; a rubber ring between the said valve and the said valve-stem bushing; suitable means for urging the said valve against the said valve-seat; and suitable means for operating the said valve; substantially as shown and described.

In testimony whereof I have hereunto signed my name in the presence of two subscribing witnesses.

GEO. LYMAN WOODWORTH.

Witnesses:
O. C. SPENCER,
JOHN H. CRIPPEN.